USO10605356B2

(12) United States Patent
Kook et al.

(10) Patent No.: US 10,605,356 B2
(45) Date of Patent: Mar. 31, 2020

(54) SHIFTING CONTROL APPARATUS AND METHOD IN DOWNHILL SECTION

(71) Applicants: Hyundai Motor Company, Seoul (KR); Kia Motors Corporation, Seoul (KR)

(72) Inventors: Jae-Chang Kook, Hwaseong-si (KR); Kwang-Hee Park, Suwon-si (KR); Byeong-Wook Jeon, Seoul (KR); Sang-Jun Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 36 days.

(21) Appl. No.: 16/156,197

(22) Filed: Oct. 10, 2018

(65) Prior Publication Data

US 2019/0257415 A1    Aug. 22, 2019

(30) Foreign Application Priority Data

Feb. 20, 2018  (KR) .......................... 10-2018-0019811

(51) Int. Cl.
*F16H 61/02*       (2006.01)
*F16H 59/18*       (2006.01)
*F16H 59/66*       (2006.01)
*F16H 59/44*       (2006.01)

(52) U.S. Cl.
CPC ..................... *F16H 61/0213* (2013.01); *B60Y 2300/18083* (2013.01); *F16H 59/18* (2013.01); *F16H 59/44* (2013.01); *F16H 59/66* (2013.01); *F16H 2059/663* (2013.01); *F16H 2300/18* (2013.01)

(58) Field of Classification Search
None
See application file for complete search history.

(56) References Cited

U.S. PATENT DOCUMENTS

| 5,555,170 | A | * | 9/1996 | Nakashima | ............. F16H 59/66 477/120 |
| 5,813,942 | A | * | 9/1998 | Nakagawa | .......... F16H 61/0213 477/120 |
| 6,626,797 | B2 | * | 9/2003 | Shiiba | ..................... F16H 59/66 477/901 |
| 6,856,866 | B2 | * | 2/2005 | Nakao | ................... B60W 10/06 701/22 |

(Continued)

FOREIGN PATENT DOCUMENTS

KR    10-1998-0050333 A    9/1998

*Primary Examiner* — Dirk Wright
(74) *Attorney, Agent, or Firm* — Morgan, Lewis & Bockius LLP

(57) ABSTRACT

A shifting control method for controlling a speed change of a vehicle in a downhill section may include collecting, by a forward road grade information collection device, information on a downhill grade which is present ahead of a vehicle, before a vehicle enters a downhill section, determining, by a driving information detection device, whether a predetermined inertial driving condition is satisfied, before the vehicle enters the downhill section, and deciding, by a control device, a shifting mode of the vehicle depending on the downhill grade, and controlling a transmission according to the decided shifting mode, at a predetermined time before the vehicle enters the downhill section.

17 Claims, 6 Drawing Sheets

(56) References Cited

U.S. PATENT DOCUMENTS

| | | | | |
|---|---|---|---|---|
| 8,099,220 B2* | 1/2012 | Kim | ................... | F16H 61/0213 |
| | | | | 477/97 |
| 8,666,623 B2* | 3/2014 | Wolfgang | ........... | F16H 61/0213 |
| | | | | 701/51 |
| 8,676,483 B2* | 3/2014 | Miura | ................... | B60W 40/12 |
| | | | | 701/123 |
| 10,197,156 B2* | 2/2019 | Sujan | ................. | F16H 61/0213 |

* cited by examiner

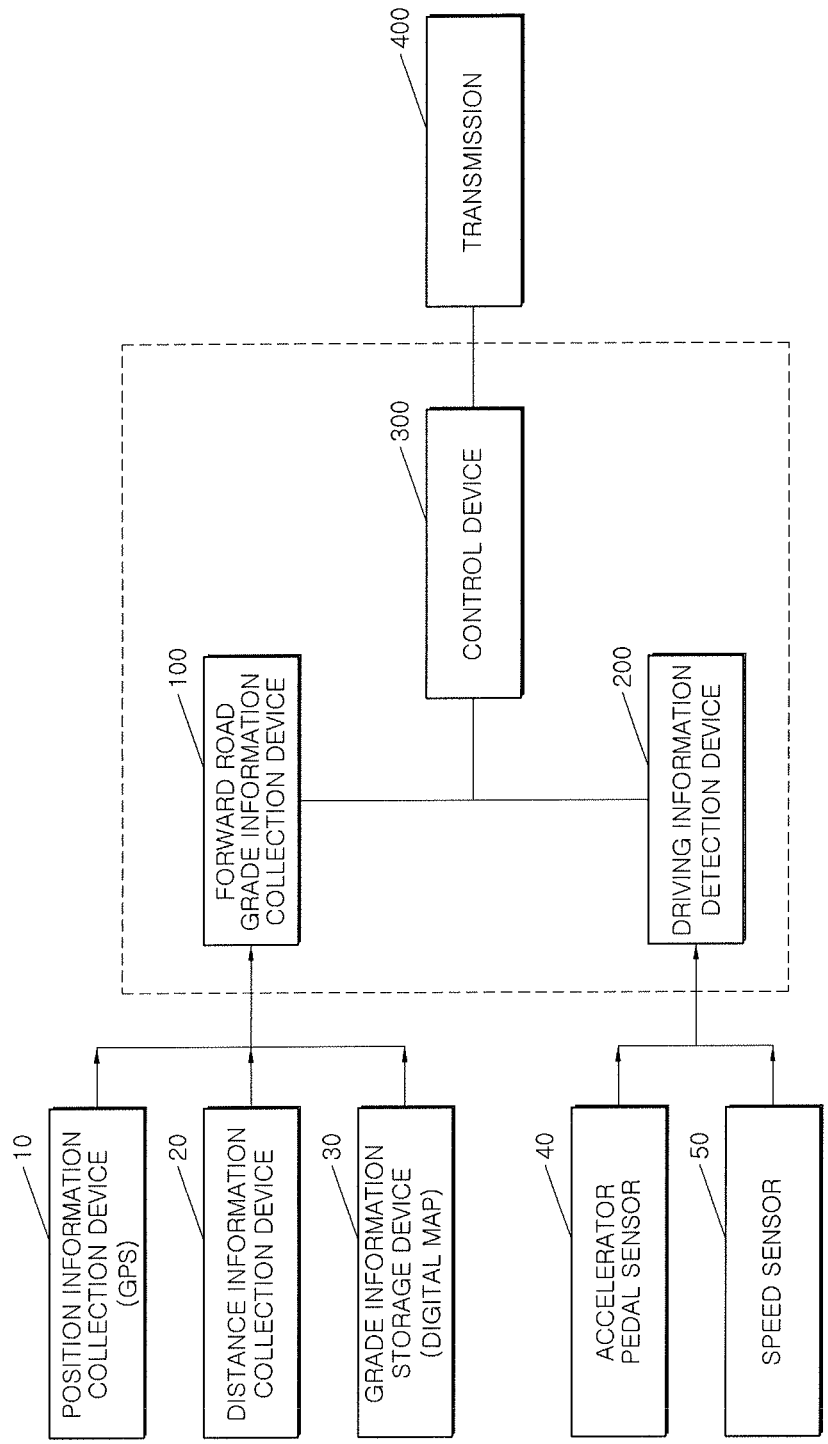

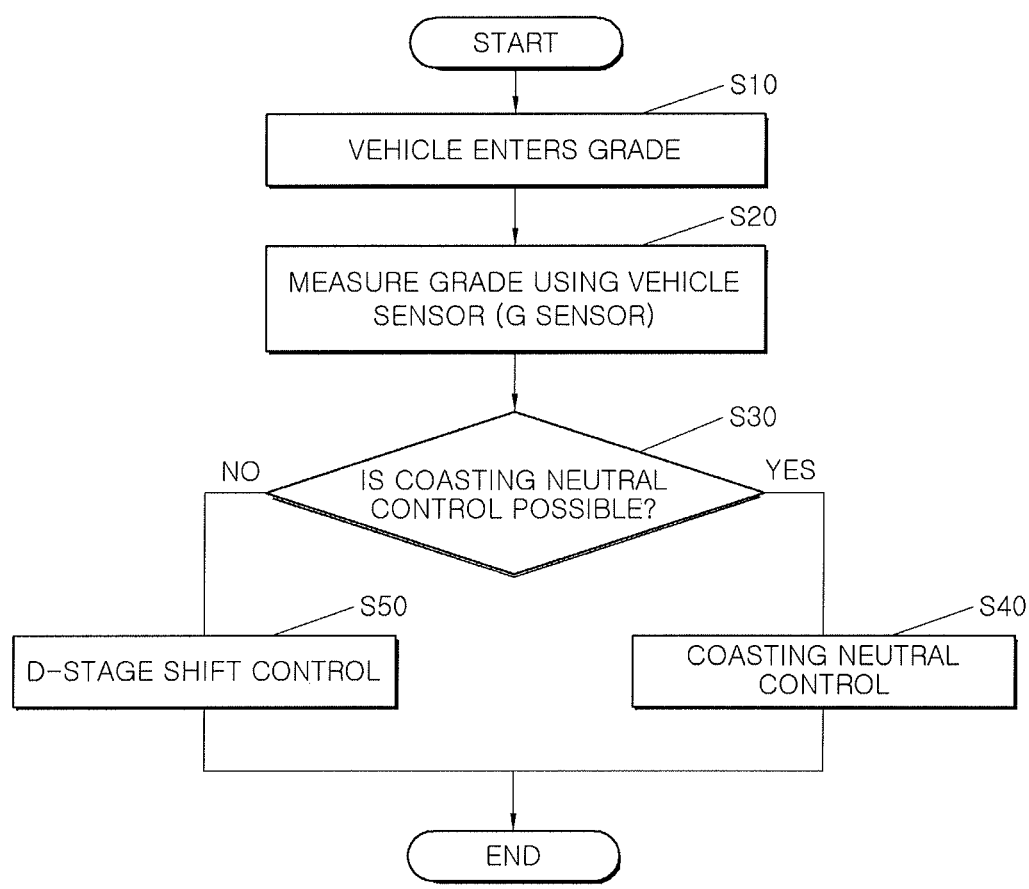

SHIFTING CONTROL APPARATUS AND METHOD IN DOWNHILL SECTION

CROSS-REFERENCE(S) TO RELATED APPLICATIONS

The present application claims priority to Korean Patent Application No. 10-2018-0019811, filed on Feb. 20, 2018, the entire contents of which is incorporated herein for all purposes by this reference.

BACKGROUND OF THE INVENTION

Field of the Invention

The present invention relates to a shifting control apparatus and method for a vehicle, and more particularly, to a shifting control apparatus and method for inertia driving when a vehicle travels in a downhill section.

Description of Related Art

When a driver takes his foot off an accelerator while driving a vehicle at a high speed on a road with a good road condition, such as a highway, the vehicle is inertia-driven (coasting operation). Typically, when a coasting operation condition is satisfied, a control device disposed in a vehicle cuts off fuel injected to an engine (fuel cut), such that the rotation of the engine is maintained without fuel injection. Therefore, the fuel efficiency is improved.

However, when a transmission is maintained at a drive gear mode (D stage) during the coasting operation, the engine may act as a load for the vehicle. In the instant case, an engine brake is operated to reduce the durability of the vehicle while degrading a ride quality. Furthermore, the traveling distance by which the vehicle may be inertia-driven is reduced, and the speed of the vehicle is rapidly lowered. Therefore, the driver reaccelerates the vehicle after the coasting operation. The increase of the reacceleration frequency may cause a reduction in fuel efficiency of the vehicle.

In the instant case, when a shift lever is maintained at the neutral mode during the coasting operation as included in Patent Document 1, the speed of the vehicle may be maintained for a long time, which makes it possible to increase the coasting distance. Therefore, the reacceleration frequency by the driver may be reduced. As a result, the fuel efficiency of the vehicle may be improved.

When the gearshift neutral control during the costing operation is used on a downhill with a steep grade, the speed of the vehicle may be rapidly increased to make the driver feel uneasy. Therefore, when performing a coasting operation on a downhill with a predetermined grade or more, the driver may not perform the gearshift neutral control (hereafter, referred to as 'coasting neutral control'), but shift the transmission to the drive gear mode (D stage) to use the engine brake (hereafter, 'D-stage shift control').

The grade of a road frequently changes from the start point of the grade until a vehicle reaches a flat road. Therefore, the vehicle may travel on a road which is started with a downhill grade at which the D-stage shift control must be used, and changed to a downhill grade at which the neutral coasting control may be used, and vice versa.

In consideration of such an aspect, the driver may recognize the grade of a downhill on which the vehicle is currently traveling, using a gravity sensor (G sensor), and decide whether to perform the coasting neutral control or the D-stage shift control, according to the recognition result. FIG. 5 is a flowchart illustrating such a control method, and FIG. 4 illustrates a behavior of the vehicle when the control method is performed.

Referring to FIG. 4 and FIG. 5, the behavior of the vehicle according to the control method will be referred to as follows. As illustrated in FIG. 4, the vehicle enters a downhill section at step S10. When the vehicle travels a predetermined distance after entering the downhill section, the grade of the downhill section is measured through a grade recognition sensor such as a G sensor at step S20. As such, a control device of the vehicle determines whether the coasting neutral control is possible, based on the measured grade, at step S30. In the example illustrated in FIG. 4, a first downhill grade θ1 with which the downhill section is started corresponds to a steep grade at which the coasting operation is impossible. Therefore, the control device performs the D-stage shift control to shift the transmission to the drive mode at the corresponding point of time, such that the engine brake is operated, at step S50. As such, when the grade is changed to a new grade, the change of the grade and the new grade are not measured through the grade recognition sensor such as a G sensor, until the vehicle enters the downhill section with the new grade and travels a predetermined distance. In the example of FIG. 4, a second grade θ2 corresponds to a gentle grade at which the coasting operation is possible. Therefore, the control device switches the current mode to the coasting neutral control mode at the corresponding point of time, to perform the coasting operation, at step S40.

In the example illustrated in FIG. 4 and FIG. 5, the control method directly recognizes the downhill grade through the sensor of the vehicle, to decide whether to use the coasting neutral control. Therefore, the control method cannot decide to use the coasting neutral control, until the vehicle enters a downhill road with the corresponding grade and travels on the downhill road. Therefore, the control method cannot perform proper control for fuel efficiency reduction at an appropriate point of time.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shifting control method and apparatus which are configured for recognizing a downhill grade before a vehicle enters the downhill grade at which coasting neutral control is possible, and performing the coasting neutral control before the vehicle enters the downhill grade.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

The shifting control method and apparatus may previously collect information on a downhill grade present ahead of a vehicle before the vehicle enters a downhill section, determine whether a predetermined inertia driving condition is satisfied before the vehicle enters the downhill section, decide a proper shifting mode at a predetermined time before the vehicle enters the downhill grade, depending on the downhill grade, and control a transmission in the decided shifting mode.

In accordance with various exemplary embodiments of the present invention, the, there is provided a shifting control method for controlling a speed change of a vehicle in a downhill section. The shifting control method may include: collecting, by a forward road grade information collection device, information on a downhill grade which is present ahead of a vehicle, before a vehicle enters a downhill section; determining, by a driving information detection device, whether a predetermined inertial driving condition is satisfied, before the vehicle enters the downhill section; and deciding, by a control device, a shifting mode of the vehicle depending on the downhill grade, and controlling a transmission according to the decided shifting mode, at a predetermined time before the vehicle enters the downhill section.

The shifting mode may include a coasting neutral control mode in which the control device operates the transmission in a neutral mode such that the vehicle is inertia-driven, and a D-stage shift control mode in which the control device operates the transmission in a drive gear mode (D stage) such that the vehicle is inertia-driven while drive resistance is caused by the inertia of an engine.

When the downhill grade based on the information on the downhill grade is equal to or greater than a predetermined angle, the control device may control the transmission by setting the shifting mode to the D-stage shift control mode before the vehicle enters the downhill grade.

When the downhill grade based on the information on the downhill grade is less than the predetermined angle, the control device may control the transmission by setting the shifting mode to the coasting neutral control mode before the vehicle enters the downhill grade.

The shifting control method may further include detecting the current position of the vehicle. The determining of whether the predetermined inertia driving condition is satisfied may be performed when the current position of the vehicle is within a first distance from the start point of the downhill grade.

The shifting control method may further include detecting the current position of the vehicle. The shifting mode may be switched when the current position of the vehicle is within a second distance from the start point of the downhill grade.

The determining of whether the predetermined inertia driving condition may be satisfied is based on one or more of a pedal force of an accelerator pedal, measured through an accelerator pedal sensor, and a vehicle speed measured through a speed sensor of the vehicle.

The shifting control method may further include: determining, by the forward road grade information collection device, whether the downhill grade is changed between the start point and end point of the downhill grade; deciding whether to switch the shifting mode at a predetermined time before the vehicle enters a new downhill grade to which the downhill grade may be changed, depending on the new downhill grade, when it is determined that the downhill grade will be changed; and controlling the transmission depending on the decided shifting mode.

In accordance with various exemplary embodiments of the present invention, a shifting control apparatus may include: a forward road grade information collection device configured to collect grade information related to a downhill section which a vehicle may enter, before the vehicle enters the start point of the downhill section; a driving information detection device configured to detect a current driving state of the vehicle to determine whether inertia driving is possible; and a control device configured to determine whether an inertia driving condition is satisfied, based on the driving state detected by the driving information detection device, decide a shifting mode during inertia driving according to the downhill grade received from the forward road grade information collection device, and control a transmission in the decided shifting mode before the vehicle enters the downhill section.

The forward road grade information collection device may include: a position information collection device configured to collect information on the current position of the vehicle; a distance information collection device configured to collect distance information between the vehicle and the start point of the downhill grade; and a grade information storage device configured to store information on the grade of a downhill section adjacent to the current vehicle position. The forward road grade information collection device may deliver to the control device information on whether an adjacent downhill section is present within a predetermined distance in the traveling direction of the vehicle and information on the corresponding downhill grade.

The driving information detection device may determine whether inertia driving is possible, based on at least one piece of measurement information between a vehicle speed and a pedal force of an accelerator pedal.

When the forward road grade information collection device determines that the position of the vehicle is within a first distance from the start point of the downhill grade, the control device may control the driving information detection device to determine whether inertia driving is possible.

When the driving information detection device determines that inertia driving is possible and the downhill grade based on the information on the downhill grade from the forward road grade information collection device is less than a predetermined angle, the control device may operate the transmission in a neutral mode such that the vehicle is inertia-driven, before the vehicle enters the downhill grade, and when the downhill grade based on the information on the downhill grade is equal to or greater than the predetermined angle, the control device may operate the transmission in a drive gear mode (D stage) such that the vehicle is inertia-driven while drive resistance is caused by the inertia of an engine.

When the forward road grade information collection device determines that the position of the vehicle is within a second distance from the start point of the downhill grade, the control device may start the transmission control based on the decided shifting mode.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a block diagram illustrating the configuration of a shifting control apparatus according to an exemplary embodiment of the present invention.

FIG. 5 is a flowchart illustrating a control method according to a comparative example.

Figure 2A:
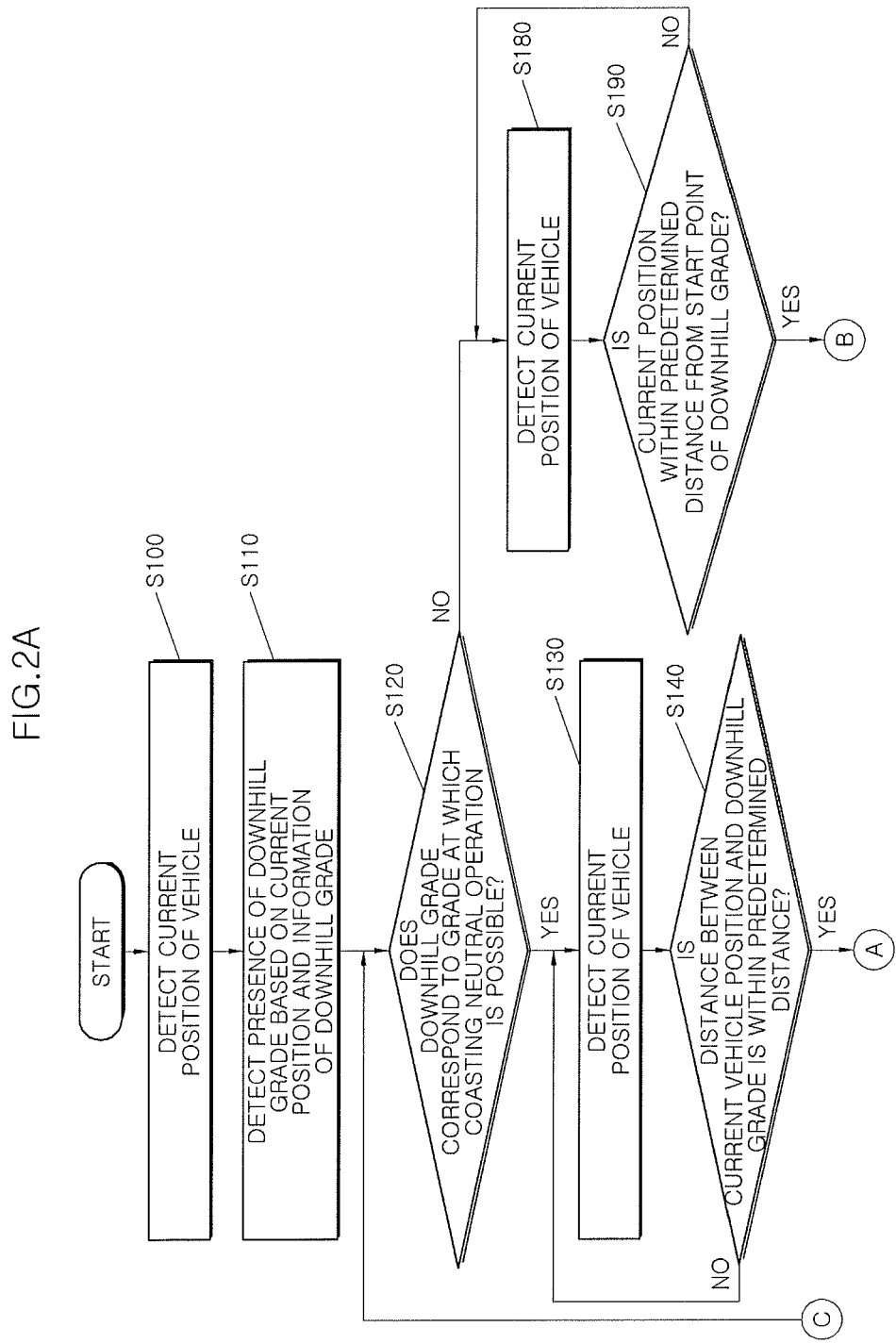
FIG. 2A and FIG. 2B are flowcharts illustrating a shifting control method according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereafter, various exemplary embodiments of the present invention will be described below in more detail with reference to the accompanying drawings.

FIG. 1 is a block diagram illustrating the configuration of a shifting control apparatus according to an exemplary embodiment of the present invention.

The shifting control apparatus according to the exemplary embodiment of the present invention includes a forward road grade information collection device 100, a driving information detection device 200 and a control device 300.

The forward road grade information collection device 100 collects information on whether a downhill grade is present in the forward traveling direction of a vehicle and information on the grade. For the present operation, the forward road grade information collection device 100 receives necessary information from a position information collection device 10 for detecting the current position of the vehicle, a grade information storage device 30 for storing information on downhill grades, and a distance information collection device 20 for collecting distance information from the start point of a downhill grade to the current position of the vehicle.

The current position information related to the vehicle may be collected from a Global Positioning System (GPS) receiver disposed in the vehicle. The GPS receiver may receive a radio wave from a satellite, determine a distance between the satellite and the vehicle using the propagation speed of the radio wave, and detect the current position of the vehicle using the distance.

Figure 3:
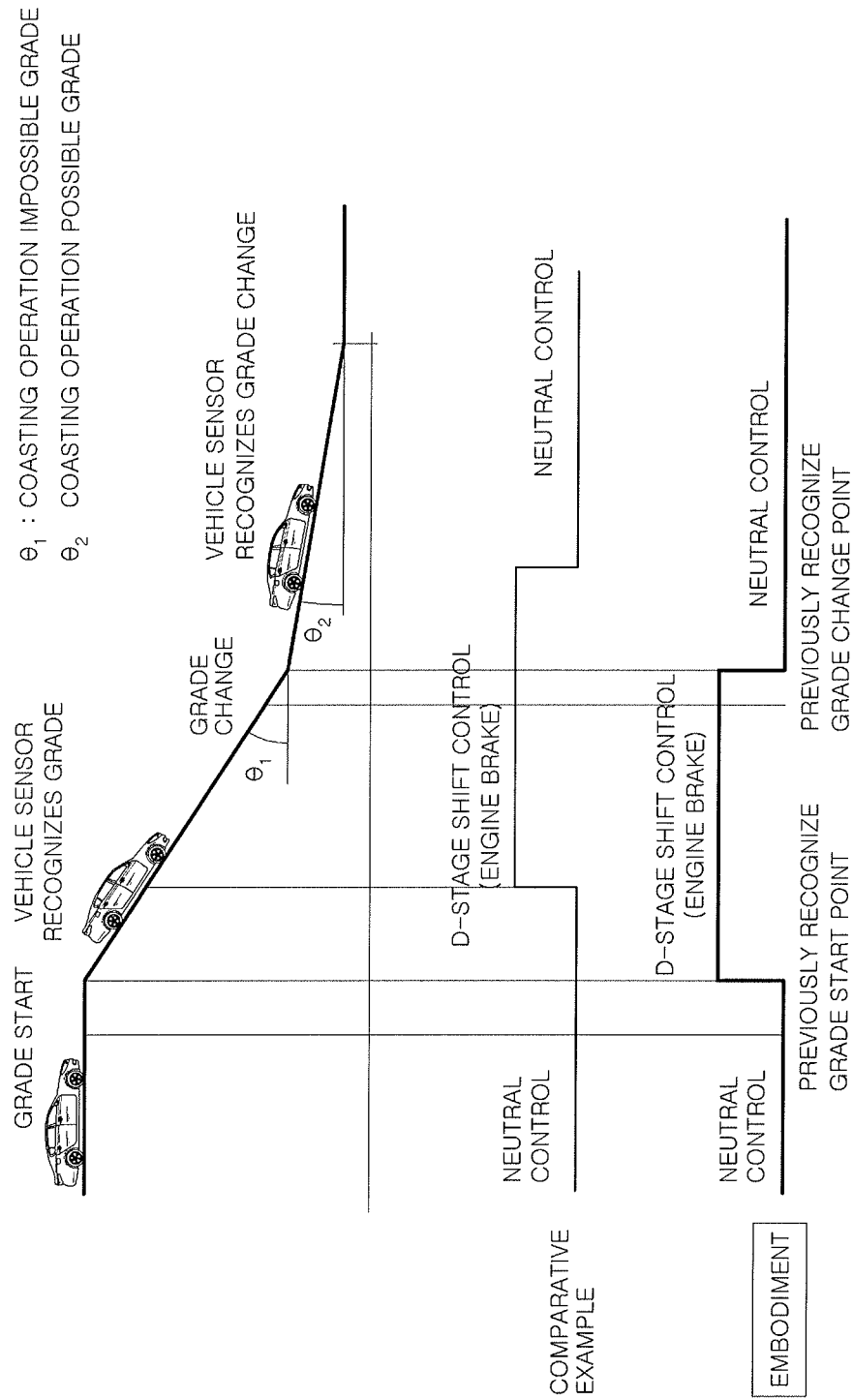
FIG. 3 comparatively illustrates a behavior of a vehicle when the exemplary embodiment of the present invention is applied, and a behavior of the vehicle when a comparative example is applied.
Figure 4:
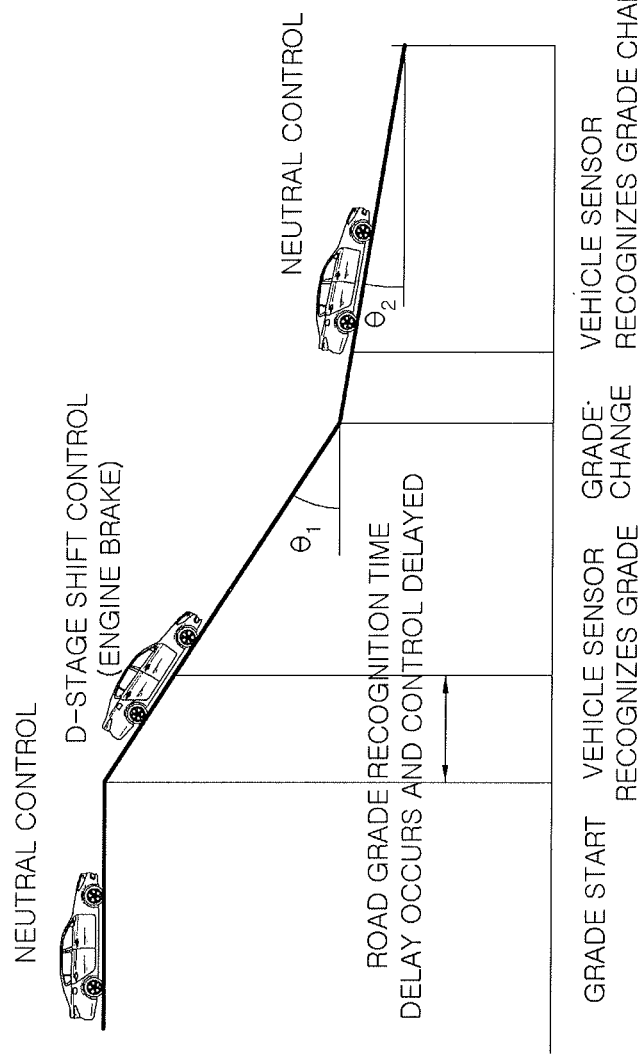
FIG. 4 illustrates a behavior of a vehicle when a control method according to a comparative example is applied.

The grade information storage device 30 may correspond to a digital map which is stored in a data storage device disposed in the vehicle, and includes grade information. In an exemplary embodiment of the present invention, the grade may indicate the slope of a route or road cut or embankment, and correspond to a value obtained by expressing the slope of a road with respect to the horizontal plane as an angle (°) or tangent (%). The grade may include an uphill grade and a downhill grade. As illustrated in FIG. 3, a downhill grade which is a collection target in an exemplary embodiment of the present invention indicates a downward angle with respect to a virtual straight line connected to the horizontal plane. The higher the downhill grade, the steeper the slope. Therefore, during coasting neutral control, the vehicle speed may rapidly increase. In the instant case, D-stage shift control needs to be performed as described later. In the exemplary embodiment of the present invention, the grade information storage device 30 is a digital map including grade information as described above. The present invention is not limited to the embodiment. The grade information storage device 30 according to the exemplary embodiment of the present invention may include any recognition devices as long as the recognition devices can recognize the downhill grade of a forward road before entering the downhill grade, except a recognition device such as a G sensor which is mounted in the vehicle and directly measures a downhill grade after the vehicle enters the downhill grade.

Using the data collected through the grade information storage device 30 and the position information collection device 10, the distance information collection device 20 determines whether the forward road has a downhill grade, and determines a distance from the start point of the downhill grade to the current position of the vehicle. The distance information collection device 20 includes a DR sensor. The DR sensor may include a sensor for measuring a traveling distance and a sensor for measuring a rotation angle, and determine the traveling direction or speed information related to the vehicle. The distance information collection device 20 may determine the traveling direction and traveling distance of the vehicle. As such, the distance information collection device 20 may determine whether a downhill grade is present in the forward traveling direction of the vehicle, and determine a distance from the start point of the downhill grade to the current position of the current vehicle, using the grade information related to the grade information storage device 30 and the current position of the vehicle, detected through the position information collection device 10.

The driving information detection device 200 detects whether the coasting operation is possible, based on the current traveling state of the vehicle or the like. For the present operation, the driving information detection device 200 may detect a vehicle speed or a pedal force of an acceleration pedal from a speed sensor 50 or an acceleration pedal sensor 40 which is disposed in the vehicle. When the vehicle speed falls within a predetermined range of 50 km/h to 150 km/h, for example, or is maintained at a vehicle speed to perform the coasting operation, and when the pedal force of the acceleration pedal is 0 or it is determined that the driver has no intention to accelerate the vehicle, the driving information detection device 200 may determine that the coasting operation is possible. Although not illustrated in FIG. 1, information on whether the brake is operated and information on the weight or turning radius of the vehicle may be used together, to more precisely determine whether the coasting operation is possible.

Based on the detection results from the forward road grade information collection device 100 and the driving information detection device 200, the control device 300 decides whether to perform the coasting operation, and sets a proper shifting mode. As such, the control device 300 controls a transmission 400 of the vehicle, based on the decided shifting mode. According to the exemplary embodiment of the present invention, the control device 300 may control the transmission 400 in a coasting neutral control mode or a D-stage shift control mode. In the coasting neutral control mode, the gearshift of the transmission 400 is set to the neutral mode such that the vehicle is inertia-driven. In the D-stage shift control mode, the gearshift of the transmission 400 is set to the drive gear mode (D stage) such that the vehicle is inertia-driven while drive resistance is caused by the inertia of the engine.

When the transmission 400 is controlled in the coasting neutral control mode, the engine does not act as a load of the vehicle. Thus, a traveling distance by the coasting operation may be increased to raise the fuel efficiency. However, when the vehicle travels on a downhill with a steep grade, the speed of the vehicle may rapidly be increased. On the other hand, when the transmission 400 is controlled in the D-stage shift control method, the engine brake may be operated to suppress a rapid increase of the vehicle speed on a downhill with a steep grade. However, a traveling distance by the coasting operation may be decreased to lower the fuel efficiency.

Therefore, the control device 300 according to the exemplary embodiment of the present invention controls the transmission 400 in a proper shifting mode before the vehicle enters a downhill grade, depending on the downhill grade in the forward traveling direction of the vehicle, which is determined by the forward road grade information collection device 100. As illustrated in FIG. 3, the control device 300 previously recognizes whether a downhill grade is present within a predetermined distance (first distance) ahead from the vehicle, and then performs proper shifting control at a point of time that the vehicle reaches a predetermined distance (second distance) from the start point of the downhill grade, depending on the downhill grade.

For example, when it is predicted that the vehicle will enter a downhill section with a predetermined grade θ1 after traveling tens of meters ahead (or traveling for tens of seconds), the control device 300 may not use the coasting neutral control so as not to suppress a rapid increase of the vehicle speed, but perform the D-stage shift control, in the case where the grade is equal to or greater than a predetermined value of 5% or more, for example, and a predetermined coasting operation condition is satisfied. Furthermore, the control device 300 controls the transmission 400 in the decided D-stage shift control mode at several meters or seconds before the vehicle enters the start point of the downhill grade.

As illustrated in FIG. 3, the downhill grade may be changed while the vehicle travels on the downhill section. In the instant case, the control device 300 may determine whether the downhill grade is changed less than a predetermined angle, through the forward road grade information collection device 100. When it is predicted that the downhill grade will be changed before the vehicle reaches the end point of the downhill section, the control device 300 repeatedly performs the above-described control on the changed downhill grade.

For example, when it is predicted that the grade of the road will be changed from the existing grade θ1 to a new grade θ2 at tens of meters ahead while the vehicle continuously travels on the downhill section (or after the vehicle travels for tens of seconds), the control device 300 determines that the coasting neutral control for fuel efficiency reduction is possible, in the case where the grade θ2 is less than a predetermined value of 5%, for example, and the predetermined coasting operation condition is satisfied. As such, the control device 300 controls the transmission 400 by switching the D-stage shift control method to the coasting neutral control mode at several meters or several seconds before the vehicle enters the start point of the downhill grade θ2.

According to the exemplary embodiment of the present invention, as illustrated in FIG. 3, the shifting control apparatus can previously recognize a downhill grade before the vehicle enters the downhill grade at which the coasting neutral control is possible, previously determine whether the coasting neutral control is possible, depending on the downhill grade of the forward road, and preemptively perform proper shifting control before the vehicle reaches the downhill section. Therefore, the shifting control apparatus can improve the fuel efficiency, compared to the comparative example that directly measures the grade through the sensor such as a G sensor after the vehicle enters the downhill grade, and then performs shifting control depending on the measurement result.

Furthermore, when the grade of a downhill road is changed while the vehicle travels on the downhill road, the shifting control apparatus can preemptively perform proper shifting control before the vehicle enters the changed grade. Thus, the shifting control apparatus can deliver a sense of stability and excellent driving feel to a driver, while improving the fuel efficiency.

Figure 2B:
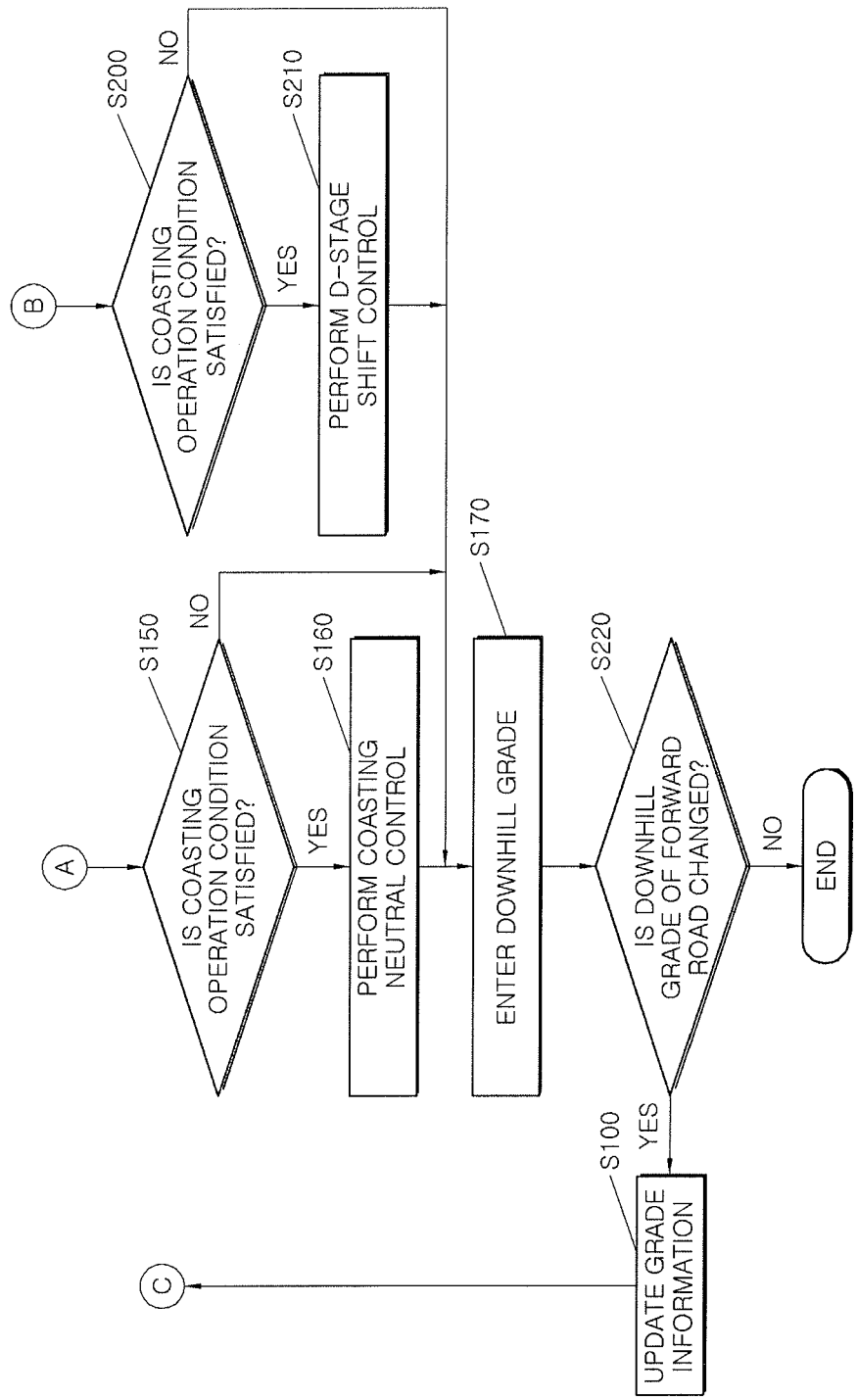

FIG. 2 is a flowchart illustrating a shifting control method according to an exemplary embodiment of the present invention, which may be used for the shifting control apparatus illustrated in FIG. 1.

As illustrated in FIG. 2, the control device 300 detects the current position of the vehicle using the position information collection device 10 at step S100. The detected current position is used to detect whether a downhill grade is present in the forward traveling direction of the vehicle.

When the current position of the vehicle is detected, the control device 300 detects information on whether a downhill grade is present within a predetermined distance (first distance) ahead of the vehicle and information on the grade from the forward road grade information collection device 100, in consideration of the speed and traveling direction of the vehicle based on the current position of the vehicle, at step S110.

When it is predicted that the vehicle will enter a downhill section with a predetermined grade θ1 at tens of meters ahead of the vehicle (or after traveling for tens of seconds), the control device 300 determines whether the downhill grade θ1 corresponds to a grade at which the coasting neutral control may be performed, based on the information on the downhill grade collected through the forward road grade information collection device 100, at step S120. For example, when the grade θ1 is less than a predetermined value of 5%, for example, the control device 300 determines that a coasting operation is possible without a rapid increase of the vehicle speed because the downhill grade is not so steep, and thus determines that the coasting neutral control may be performed. On the other hand, when the coasting neutral control is performed even though the grade θ1 is equal to or greater than the predetermined value of 5%, for example, the control device 300 estimates that the vehicle speed will rapidly increase while the vehicle travels on the downhill section, and determines that the coasting neutral control is impossible.

When it is determined that the coasting neutral control may be performed, the control device 300 detects the current position of the vehicle at step S130. The detected current position of the vehicle is used to detect a point of time for controlling the transmission in the coasting neutral control mode before the vehicle reaches the downhill section.

The control device 300 detects whether the detected current position of the vehicle is within a predetermined distance (second distance) from the start point of the downhill grade, at step S140. When the detected current position of the vehicle is within the predetermined distance (the second distance) from the start point of the downhill grade, the control device 300 determines whether the coasting operation (inertia driving) is possible, based on the detection information related to the driving information detection device 200. To determine the coasting operation condition, the control device 300 may determine whether the vehicle speed is within a predetermined range of 50 km/h to 150 km/h, for example, or maintained at a vehicle speed to perform inertia driving, and whether the pedal force of the acceleration pedal is 0 or the driver has no intention to accelerate the vehicle. When one or more of the two conditions are satisfied, the control device 300 may determine that the coasting operation condition is satisfied.

When it is determined that the coasting operation condition is satisfied and the coasting neutral control may be performed, the control device 300 performs the coasting neutral control at the corresponding point of time at step S160. That is, during the coasting operation control in which fuel injected to the engine is cut (fuel cut) to maintain the rotation of the engine without fuel injection, the control device 300 controls the transmission 400 in the neutral state such that the vehicle is inertia-driven. As such, the vehicle controlled in such a shifting mode enters the downhill grade at step S170.

When the detection result at step S120 indicates that the downhill grade θ1 is so steep that the coasting neutral operation is impossible, the control device 300 also detects the current position of the vehicle at step S180. The detected current position is used to detect a point of time for controlling the transmission in the D-stage shift control mode before the vehicle reaches the downhill grade, during the coasting operation control.

The control device 300 determines whether the detected current position of the vehicle is within a predetermined distance (second distance) from the start point of the downhill grade, at step S190. When the detected current position of the vehicle is within the predetermined distance (the second distance) from the start point of the downhill grade, the control device 300 determines whether the coasting operation (inertia driving) is possible, based on the detection information related to the driving information detection device 200.

When it is determined that the coasting operation condition is satisfied and the coasting neutral control may be performed, the control device 300 controls the transmission in the D-stage shift control mode at the corresponding point of time at step S210. That is, during the coasting operation control in which fuel injected to the engine is cut (fuel cut) to maintain the rotation of the engine without fuel injection, the control device 300 controls the transmission 400 in the drive gear mode (D stage) such that the vehicle is inertia-driven. As such, the vehicle controlled in such a shifting mode enters the downhill grade at step S170, and performs the coasting operation.

Since the coasting neutral control is performed within the second distance from the start point of the downhill grade, the control device 300 can preemptively perform proper shifting control depending on the grade immediately before the vehicle enters the downhill grade.

As illustrated in FIG. 3, the downhill grade may be changed while the vehicle travels on the downhill section. Therefore, the control device 300 determines whether the grade of the downhill section on which the vehicle is traveling is changed, through the forward road grade information collection device 100, before the vehicle enters the corresponding grade, at step S220. When it is predicted that the downhill grade will be changed before the vehicle reaches the end point of the downhill section, the control device 300 updates the information on the downhill grade at step S100, and determines whether the coasting neutral operation is possible, based on the updated information on the new grade θ2, at step S120. According to the determination result, the control device 300 may perform proper shifting control before the vehicle enters the changed grade, depending on the grade changed through the above-described step.

Therefore, when the grade of a downhill road is changed while the vehicle travels on the downhill road, the shifting control method can preemptively perform proper shifting control before the vehicle enters the changed grade. Thus, the shifting control method can deliver a sense of stability and excellent driving feel to a driver, while improving the fuel efficiency In accordance with the exemplary embodiments of the present invention, the shifting control apparatus and method can recognize a downhill before the vehicle enters the downhill grade at which the coasting neutral control is possible, previously determine whether the coasting neutral control is possible, depending on the downhill grade of the forward road, and preemptively perform proper transmission control immediately before the vehicle enters the grade, improving fuel efficiency.

Furthermore, when the grade is changed while the vehicle travels on the downhill road, the shifting control apparatus and method can preemptively perform proper transmission control before the vehicle enters the changed grade, a sense of stability and excellent driving feel to a driver, while improving the fuel efficiency.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting control method for controlling a speed change of a vehicle in a downhill section, comprising:

collecting, by a forward road slope information collection device, information on a downhill slope which is present ahead of the vehicle, before the vehicle enters the downhill section;

determining, by a driving information detection device, whether a predetermined inertial driving condition is satisfied, before the vehicle enters the downhill section; and deciding, by a controller, a shifting mode of the vehicle depending on the downhill slope when the predetermined inertial driving condition is satisfied, and controlling a transmission according to the decided shifting mode, before the vehicle enters the downhill section.

2. The shifting control method of claim 1, wherein the shifting mode includes a coasting neutral control mode in which the controller operates the transmission in a neutral mode such that the vehicle is inertia-driven, and a D-stage shift control mode in which the controller operates the transmission in a drive gear mode (D stage) such that the vehicle is inertia-driven while drive resistance is caused by an inertia of an engine.

3. The shifting control method of claim 2, wherein, when the controller determines that an angle of the downhill slope based on the information on the downhill slope is equal to or greater than a predetermined angle, the controller is configured to control the transmission by setting the shifting mode to the D-stage shift control mode before the vehicle enters the downhill section.

4. The shifting control method of claim 3, further including detecting a current position of the vehicle,
wherein the shifting mode is switched when the current position of the vehicle is within a second distance from a start point of the downhill section.

5. The shifting control method of claim 2, wherein, when the controller determines that the angle of the downhill slope based on the information on the downhill slope is less than a predetermined angle, the controller is configured to control the transmission by setting the shifting mode to the coasting neutral control mode before the vehicle enters the downhill section.

6. The shifting control method of claim 1, further including detecting a current position of the vehicle, wherein the determining of whether the predetermined inertia driving condition is satisfied is performed when the current position of the vehicle is within a first distance from a start point of the downhill section.

7. The shifting control method of claim 6, wherein the shifting mode is switched when the current position of the vehicle is within a second distance from the start point of the downhill section and wherein the second distance is longer than the first distance.

8. The shifting control method of claim 1, wherein the determining of whether the predetermined inertia driving condition is satisfied is based on at least one of a pedal force of an accelerator pedal, measured by the controller through an accelerator pedal sensor, and a vehicle speed measured by the controller through a speed sensor of the vehicle.

9. The shifting control method of claim 1, further including:
determining, by the forward road slope information collection device, whether the downhill slope is changed between the start point and an end point of the downhill slope;
deciding whether to switch the shifting mode at a predetermined time before the vehicle enters a new downhill slope to which the downhill slope is to be changed, depending on the new downhill slope, when the angle of the downhill slope is determined by the controller to be changed less than a predetermined angle; and
controlling the transmission depending on the decided shifting mode.

10. The shifting control method of claim 9, wherein, when the controller determines that an angle of the new downhill slope is lesser than the predetermined angle, the controller is configured to control the transmission by setting the shifting mode to a coasting neutral control mode before the vehicle enters the downhill section.

11. A shifting control apparatus comprising:
a forward road slope information collection device configured to collect slope information related to a downhill section which a vehicle is to enter, before the vehicle enters a start point of the downhill section;
a driving information detection device configured to detect a current driving state of the vehicle to determine whether inertia driving of the vehicle is possible; and
a controller configured to determine whether an inertia driving condition of the vehicle is satisfied, based on the current driving state detected by the driving information detection device, decide a shifting mode during the inertia driving according to a downhill slope received from the forward road slope information collection device, and control a transmission in the decided shifting mode before the vehicle enters the downhill section.

12. The shifting control apparatus of claim 11, wherein the forward road slope information collection device includes:
a position information collection device configured to collect information on a current position of the vehicle;
a distance information collection device configured to collect distance information between the vehicle and the start point of the downhill section; and
a slope information storage device configured to store information on a slope of a downhill section adjacent to the current position of the vehicle,
wherein the forward road slope information collection device delivers to the controller information on whether an adjacent downhill section is present within a predetermined distance in a traveling direction of the vehicle and information on a corresponding downhill slope thereof.

13. The shifting control apparatus of claim 11, wherein the driving information detection device is configured to determine whether the inertia driving is possible, based on at least one piece of measurement information between a vehicle speed and a pedal force of an accelerator pedal.

14. The shifting control apparatus of claim 12, wherein, when the forward road slope information collection device determines that a position of the vehicle is within a first distance from the start point of the downhill section, the controller is configured to control the driving information detection device to determine whether the inertia driving is possible.

15. The shifting control apparatus of claim 12, wherein, when the driving information detection device determines that the inertia driving is possible and an angle of the downhill slope based on the information on the downhill slope from the forward road slope information collection device is less than a predetermined angle, the controller operates the transmission in a neutral mode such that the vehicle is inertia-driven, before the vehicle enters the downhill section, and
when the downhill slope based on the information on the downhill slope is equal to or greater than the predetermined angle, the controller operates the transmission in a drive gear mode (D stage) such that the vehicle is inertia-driven while drive resistance is caused by an inertia of an engine.

16. The shifting control apparatus of claim 15, wherein, when the forward road slope information collection device determines that a position of the vehicle is within a second distance from the start point of the downhill section, the controller starts the transmission control based on the decided shifting mode.

17. The shifting control apparatus of claim 14, wherein, when the forward road slope information collection device determines that a position of the vehicle is within a second distance from the start point of the downhill section, the controller starts the transmission control based on the decided shifting mode and wherein the second distance is longer than the first distance.

* * * * *